United States Patent [19]
Takeuchi et al.

[11] Patent Number: 5,900,616
[45] Date of Patent: May 4, 1999

[54] IMAGE SCANNER

[75] Inventors: Minoru Takeuchi; Mitsuo Hirano; Mitsuo Tsushima, all of Iwate-ken, Japan

[73] Assignee: Alps Electric Co., Ltd., Tokyo, Japan

[21] Appl. No.: 08/792,591

[22] Filed: Jan. 31, 1997

[30] Foreign Application Priority Data

| Feb. 5, 1996 | [JP] | Japan | 8-18947 |
| Feb. 5, 1996 | [JP] | Japan | 8-18948 |
| Feb. 5, 1996 | [JP] | Japan | 8-18949 |

[51] Int. Cl.$^6$ .................................................. G06K 7/10
[52] U.S. Cl. ................................ 235/472.01; 235/454
[58] Field of Search .............................. 235/472.01, 454

[56] References Cited

U.S. PATENT DOCUMENTS 5,291,028 3/1994 Droge et al. .............................. 235/472

FOREIGN PATENT DOCUMENTS

| 0153 002 A2 | 8/1985 | European Pat. Off. . |
| 0524336 A1 | 1/1993 | European Pat. Off. . |
| 1211908 | 11/1970 | United Kingdom . |
| 1367799 | 9/1974 | United Kingdom . |
| 1594145 | 7/1981 | United Kingdom . |
| 2302405 | 1/1997 | United Kingdom . |
| WO 93/09514 | 5/1993 | WIPO . |

*Primary Examiner*—Harold I. Pitts
*Attorney, Agent, or Firm*—Brinks Hofer Gilson & Lione

[57] ABSTRACT

An image scanner is provided which is capable of preventing decrease in image contrast and improving the reading accuracy and quality of color images to a greater extent. An image scanner includes a unit case having an opening formed on one end surface thereof; light-source lamps and light-source lenses which are disposed in the inner portion of the opening of the unit case in such a manner as to face the opening; holding plates which are disposed in the inner portion of the opening of the unit case and which have formed therein slits for extending the terminals of the light-source lamps to the inside of the unit case; and CCD sensors, disposed at the end portion of the inside of the unit case on the side opposite to the opening, for reading an image of the original document by receiving, via a lens unit, light which is radiated onto a given original document placed near the opening from the light-source lamps via the light-source lenses and reflected from this original document.

3 Claims, 2 Drawing Sheets

IMAGE SCANNER

BACKGROUND OF THE INVENTION

1. Field of the Invention

The present invention relates to an image scanner and, more particularly, to an image scanner for reading images by radiating light onto a given original document and by reading with CCD sensors the light reflected therefrom.

2. Description of the Related Art

Hitherto, image reading means called image scanners for radiating light onto an original document from a light source, reading light reflected from this original document by means of a plurality of arrayed CCD sensors, converting the image information of the original document into electrical signals and outputting the signals have been used in peripheral units of a computer and recording apparatuses having image reading means incorporated therein.

A conventional image scanner will be described below. FIG. 3 shows a conventional image scanner. An image scanner 31 has a box-type unit case 32 in the shape of a rectangle, with an opening 33 substantially in the shape of a square being formed in such a manner as to face a given original document (not shown) at one end surface of the unit case 32 along the length thereof. This opening 33 has a length dimension which extends substantially across both sides of the unit case 32.

Further, holding plates 34 which are extendedly provided along the side surface of the unit case 32 are integrally formed in both side portions of the inside of the opening 33 of the unit case 32 in such a manner as to project inwards, and the inner edge of the holding plate 34 has an inner wall 34a formed so as to extend in the direction of the opening 33.

A recess-shaped lamp housing section which is opened toward the opening 33 is formed between the inner wall 34a of the holding plate 34 and the inner side surface of the unit case 32, and a circular-cylinder-shaped lamp 35 is disposed in the innermost portion of the lamp housing section. Further, a light-source lens 36 is disposed in the opening portion of the lamp housing section.

Further, in the side surface portion of the inside of the unit case 32 of the holding plate 34, a slit which extends along the side surface of the unit case 32 is formed and a substrate 37 having a conductor pattern for supplying power to the lamp 35 is disposed.

FIG. 4 shows the substrate 37 and the conductor pattern 38 thereof. The substrate 37 is formed substantially in the shape of a □ symbol in its plane shape by glass epoxy which is a light transmitting material, and the conductor pattern 38 is formed only in a portion required for wiring on the surface of the inside of the unit case 32 of the substrate 37.

A further description will now be given. The conductor pattern 38 is formed of a conductor pattern 38a for connecting either the positive or negative terminal of the lamp 35 and a conductor pattern 38b for connecting the other terminal. The conductor patterns 38a and 38b are formed only in a part of the inner surface of the unit case 32 of the substrate 37, and the substrate 37 made of a light transmitting material is exposed at the portion where the conductor pattern 38 is not formed so as to provide electrical insulation. Further, a terminal 39 connected to both sides of the lamp 35 is extended from the slit into the interior of the unit case 32, so that the terminal 39 is electrically connected to the conductor pattern 38 formed on the substrate 37.

By turning on the lamp 35 by supplying electric current thereto, radiation light from the lamp 35 is radiated from the opening of the unit case 32 via the light-source lens 36 to the outside so that a desired original document (not shown) placed near the opening 33 is radiated.

Further, a CCD sensor 40 is disposed at the end portion of the inside of the unit case 32 on the side opposite to the opening 33, and a circular-cylinder-shaped lens unit 41 is disposed between the opening 33 and the CCD sensor 40 in the inside of the unit case 32. The lens unit 41 includes a light entry section 42 for admitting light which is radiated from the lamp 35 via the light-source lens 36 and which is reflected from the original document, and a light emergence section 43 for causing this light to exit to the CCD sensor 40, with a plurality of image forming lenses 44 and 44 for focusing the incident light from the light entry section 42 so as to form an image on the CCD sensor 40 being disposed with a predetermined space therebetween in the inside of the lens unit 41.

In the above-described conventional image scanner 31, an intended original document is first placed near the opening 33 of the image scanner 31, and the image scanner 31 and the original document are moved relative to each other in a state in which the lamp 35 is switched on. As a result, the radiation light from the lamp 35 is radiated from the opening 33 through the light-source lens 36 onto the original document, after which the light is reflected by this original document, is made to re-enter the unit case 32 from the opening 33, and enters the light entry section 42 of the lens unit 41 after passing through the space between the holding plates 34.

The light entering the lens unit 41 is collected by the image forming lenses 44 of the lens unit 41 and is radiated onto the CCD sensor 40 from the light emergence section 43. Thus, image information from the original document is obtained by the CCD sensor 40.

However, in the above-described conventional image scanner 31, since the opening 33 has a length dimension which extends substantially across both sides of the unit case 32, the light from the light-source lamp 35 is radiated over a wide range of the original document. For this reason, a large amount of light is reflected from portions out of the actual reading range of the original document, and this unwanted reflected light is collected by the lens unit 41 and received by the CCD sensor 40. As a result, there is a problem that the contrast of the image of the original document decreases, resulting in a considerable decrease in reading accuracy.

There is another problem in the image scanner 31 in that light radiated from the lamp 35 is randomly reflected by the light-source lens 36, such radiation light is radiated not only onto the original document surface, but also onto the inside of the unit case 32 and directly radiated onto the lens unit 41, resulting in a decrease in the contrast of the image of the original document and a decrease in reading accuracy.

There is a further problem in the image scanner 31 in that light radiated from the lamp 35 leaks from the slits formed in the holding plates 34 and 34 and from the portion of the substrate 37 made of a light transmitting material where the conductor pattern 38 is not formed, and this leaked light is directly radiated onto the lens unit, resulting in a decrease in the contrast of the image of the original document and a decrease in reading accuracy.

Even with an image scanner having the above-described problems, in a case in which the image of the original document to be read is a monochrome image and read by binarization, a major problem is not incurred even if the contrast of the image is poor. However, in a case in which the image of the original document is in color and is read at multi-valued gradations of, for example, 256 in order to obtain color image information, unwanted light such as that described above is input and the contrast of the image is decreased, and a problem occurs in which the quality of the image to be read decreases.

If a non-light-transmitting material is used for the above-described substrate, at least the problem of light leaking from the substrate is overcome; however, use of materials other than inexpensive glass epoxy results in a high price. Further, if coloring is performed to make the substrate made of a glass epoxy material non-permeable to light, a problem occurs in that the number of steps therefor increases, resulting in increased cost.

SUMMARY OF THE INVENTION

It is an object of the present invention to provide an image scanner which is capable of improving the reading accuracy and quality of a color image to a greater extent by preventing a decrease in the contrast of the image.

To achieve the above-described object, according to the present invention, there is provided an image scanner comprising: a unit case having an opening formed on one end surface thereof; light-source lamps and light-source lenses which are disposed in the inner portion of the opening of the unit case in such a manner as to face the opening; holding plates which are disposed in the inner portion of the opening of the unit case and which have formed therein slits for extending the terminals of the light-source lamps to the inside of the unit case; and CCD sensors, disposed at the end portion of the inside of the unit case on the side opposite to the opening, for reading an image of the original document by receiving, via a lens unit, light which is radiated onto a given original document placed near the opening from the light-source lamps via the light-source lenses and reflected from this original document.

It is another object of the present invention to provide an image scanner, with the length dimension of the opening being made to be approximately two times as great as the reading range of the original document.

It is a further object of the present invention to provide an image scanner having a light shielding section for shielding light, which projects inwards, formed in the inner wall of the holding plate, so that radiation light from the light-source lamp is not directly radiated onto the lens unit.

It is a still further object of the present invention to provide an image scanner which holds on the holding plate a substrate made of a light transmitting material having formed thereon a conductor pattern for supplying power to the light-source lamp.

It is a still further object of the present invention to provide an image scanner such that the conductor pattern is formed in such a manner as to cover substantially the entire surface of the substrate.

It is a still further object of the present invention to provide an image scanner such that the conductor pattern is formed in such a way that the positive side thereof and the negative side thereof face each other with a very small space therebetween.

The above and further objects, aspects and novel features of the invention will become more apparent from the following detailed description when read in connection with the accompanying drawings.

DETAILED DESCRIPTION OF THE PREFERRED EMBODIMENT

The preferred embodiment of the present invention will be described below with reference to FIGS. 1 and 2.

Figure 1:
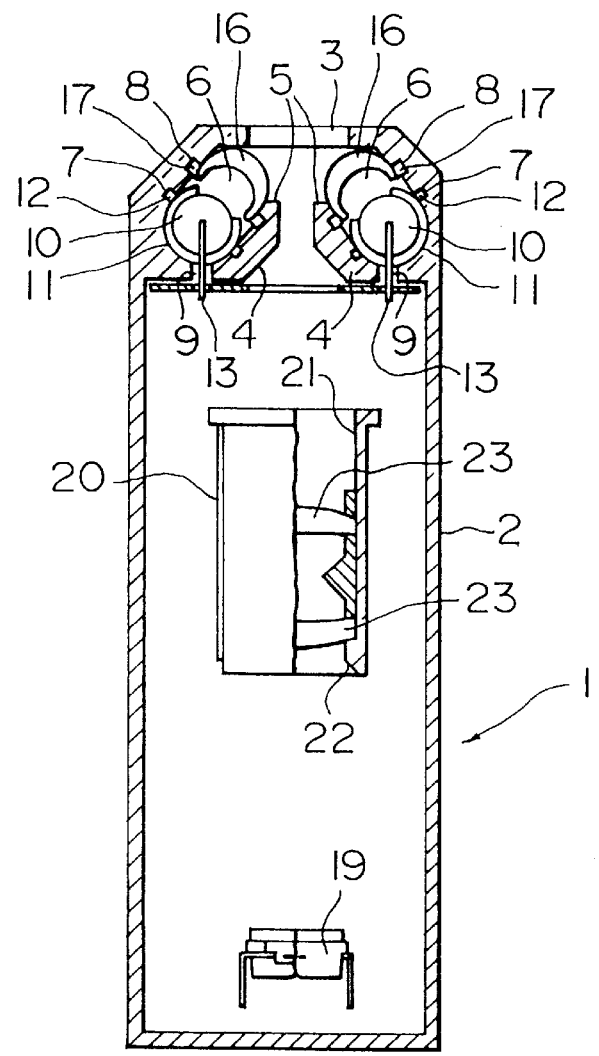
FIG. 1 is a plan view illustrating an embodiment of an image scanner according to the present invention.

FIG. 1 shows an embodiment of an image scanner 1 of the present invention. In this embodiment, the image scanner 1 has a substantially rectangular box-type unit case 2, with a square-shaped opening 3 being formed on one end surface of the unit case 2 along the direction of the length thereof in such a manner as to face a given original document (not shown) from which an image is to be read. The opening 3 is formed with a width dimension which extends across both sides of the unit case 2 and with a length dimension such that light is radiated only within a range required to read the original document. In this embodiment, the length dimension of the opening 3 is formed into approximately two times as long as the reading range A.

Holding plates 4 and 4 which respectively extend along both sides of the unit case 2 are integrally formed in the inner portion of the opening 3 of the unit case 2 in such a manner as to project inwards. The inner edge of each of the holding plates 4 and 4 has an inner wall 5 formed in such a manner as to extend in the direction of the opening 3. Recess-shaped lamp housing sections 6 which is opened toward the opening 3 are formed between the inner walls 5 of the holding plates 4 and 4 and the inner wall surface of the unit case 2. Lamp locking recesses 7 and light-source lens locking recesses 8 are respectively formed on the inner surfaces of the inner walls of the holding plates 4 and 4 and on the inner surface of the unit case 2. Further, the holding plates 4 and 4 are formed with a plurality of slits 9 along the side surface of the unit case 2.

Furthermore, lamps 10, which are light sources, are disposed in the innermost portion of the lamp housing section 6, and fixation plates 11 having an arc shape in their cross sections for fixing the lamps 10 into the inner portions of the lamp housing sections 6 are mounted on the outer peripheral surface of the lamps 10. Locking projections 12 are protrusively provided on both side portions of the outer peripheral surface of the fixation plates 11, so that by locking the locking projections 12 into the lamp locking recesses 7, the lamps 10 are fixed into the lamp housing sections 6. Further, terminals 13 connected to both end portions of the lamps 10 are extended from the slits 9 to the inside of the unit case 2. These terminals 13, as will be described later, are electrically connected to a conductor pattern 15 for supplying power to the lamps 10, which is formed on a substrate 14 disposed on the side surface of the inside of the unit case 2 of the holding plates 4 and 4.

Figure 2:
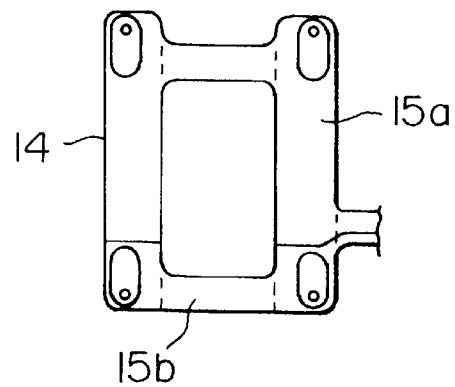
FIG. 2 is a front view illustrating the structure of a substrate having formed thereon a conductor pattern for power-source lamps of the image scanner shown in FIG. 1.
Figure 3:
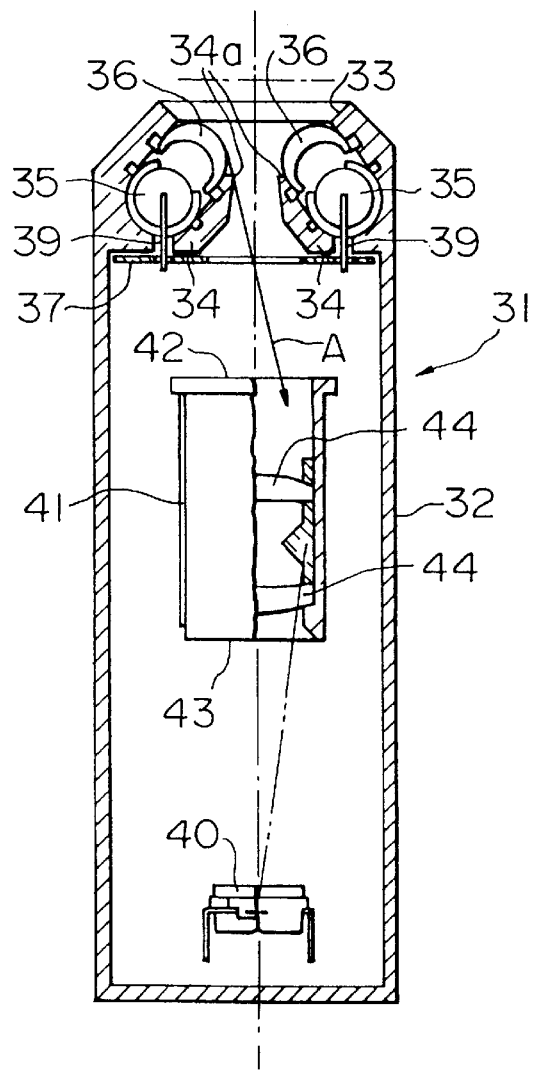
FIG. 3 is a plan view illustrating the structure of the essential portion of a conventional image scanner.
Figure 4:
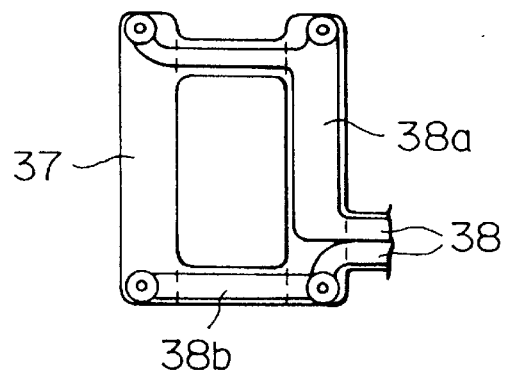
FIG. 4 is a front view illustrating the structure of a substrate having formed thereon a conductor pattern for power-source lamps of the image scanner shown in FIG. 2.

FIG. 2 shows the substrate 14 which is made of glass epoxy which is a light transmitting material and which is formed substantially in the shape of a □ symbol in its plane shape. As shown in FIG. 2, two conductor patterns 15 are formed on the substrate 14 in such a manner as to cover the entire surface of the inner portion of the unit case. A further description will now be given. The conductor pattern 15 is formed of a conductor pattern 15a for connecting either the positive or negative terminal 13 of the lamp 10 and a conductor pattern 15b for connecting the other terminal 13. These two conductor patterns 15a and 15b are formed facing each other with a very small space therebetween for preventing a short-circuit. The terminals 13 which are connected to both end portions of the lamp 10 are extended from the slits 9 to the inside of the unit case 2 and are respectively electrically connected to the conductor patterns 15a and 15b formed on the substrate 14.

Further, a part of the conductor pattern 15 is extended outside the unit case 2 and connected to the power source (not shown) of the lamp 10.

Furthermore, light-source lenses 16 having an arc shape in their cross sections are disposed in the opening portions of the lamp housing sections 6 in such a manner that the arc portions project from the opening portions, with locking claws 17 formed on both side edges of the light-source lenses 16. By locking each of the locking claws 17 into the lens locking recesses 8, the light-source lenses 16 are fixed.

These lamps 10 are switched on by supplying electric current to the lamps 10 so as to radiate light from the opening 3 of the unit case 2 via the light-source lenses 16 to the outside, and the light is radiated onto the original document placed near the opening 3.

Further, a CCD sensor 19 for reading images having a resolution of, for example, 600 dpi (dot per inch) mounted on a substrate (not shown) is disposed at the end portion of the inside of the unit case 2 on the side opposite to the opening 3. A lens unit 20 substantially in the shape of a circular cylinder is disposed between the opening 3 and the CCD sensor 19 inside of the unit case 2. This lens unit 20 includes a light entry section 21 for admitting light which is radiated from the lamps 10 via the light-source lenses 16 and reflected from the original document and a light emergence section 22 for causing this light to exit to the CCD sensor 19. Inside of the lens unit 20, a plurality of image forming lenses 23 which focus light entering from the light entry section 21 to converge on the CCD sensor 19 are disposed with a predetermined space therebetween.

Further, in this embodiment, a light-shielding section 18 which projects inwards is formed on the inner walls 5 of the holding plates 4 and 4 so as to prevent light radiated from the lamps 10 via the light-source lenses from being directly radiated onto the light entry section 21 of the lens unit 20.

Next, the operation of this embodiment will be described below.

In this embodiment, an original document is first disposed near the opening 3 of the image scanner 1 in such a manner as to face the opening 3, and the image scanner 1 and the original document are moved relative to each other in a state in which the lamp 10 is switched on. As a result, the radiated light from the lamps 10 is radiated onto the original document from the opening 3 via the light-source lenses 16. The light reflected from the original document re-enters the unit case 2 from the opening 3 and enters the light entry section 21 of the lens unit 20 through the space between the holding plates 4 and 4.

The light entering the lens unit 20 is collected by the image forming lenses 23 of the lens unit 20, is made to emerge from the light emergence section 22, is received by the CCD sensor 19, and thus read as image information of the original document by the CCD sensor 19.

The image information of the original document read in this way is output to an image control circuit (not shown) formed of, for example, a CPU, memory and the like. The image control circuit causes the image to be displayed on a display unit, such as a CRT, on the basis of the image information so that image processing is performed thereon or printing based on the image information is performed.

In the image scanner of this embodiment as described above, since the length dimension of the opening 3 is formed into a length dimension of approximately twice as long as the reading range of the image, it is possible to reduce light reflected from portions other than the actual reading range A of the original document as compared with a case in which light is radiated onto an original document over a wide range as has hitherto been done. Therefore, it is possible to reduce unwanted light from the original document which is reflected from portions other than the reading range A and which is received by the CCD sensor 19 via the lens unit 20.

Also, in the image scanner of this embodiment, since the light-shielding section 18 is formed on the inner wall 5 of the holding plate 4, it is possible to prevent light from directly entering the light entry section 21 of the lens unit 20 even when light radiated from the lamps 10 is randomly reflected by the light-source lenses 16 and leaks into the inside of the unit case 2 rather than onto the original document.

Further, in the image scanner of this embodiment, since the substrate 14 is disposed on the side portion of the inside of the unit case 2 of the holding plate 4, which substrate 14 has formed thereon the conductor pattern 15 in such a manner as to cover substantially the entire surface thereof, it is possible to surely prevent light radiated from each lamp 10 from leaking through the slit 9 formed in the holding plate 4 into the inside of the unit case 2.

As described above, in the image scanner of this embodiment, since only light reflected from the original document enters the light entry section 21 of the lens unit 20, the contrast of the image can be improved to a greater extent. Thus, the following significant advantages can be obtained: in reading color images, reading at multi-valued gradations, such as 256 gradations, can be performed with a high degree of accuracy, and the quality of images to be read can be improved.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An image scanner including light sources for emitting light onto a document to be scanned, a CCD sensor for capturing an image on said document and a lens unit for focusing said image on said CCD sensor, said image scanner further comprising:

a unit case for housing said light sources, said lens unit and said CCD sensor, said unit case having an opening through which said document is scanned;

holding plates for securing said light sources inside said unit case, said holding plates extending to partially block light from said light sources so as to prevent the light from entering said lens unit directly from said light sources; and a substrate made of a light-transmitting material and located between said light sources and said lens unit; said substrate having conductor patterns formed thereon for supplying electrical power to said light sources, said conductor patterns being made of a non light-transmitting material and laid on said substrate to cover substantially the entire surface of said substrate to block light from entering said lens unit through said substrate from said light sources.

2. An image scanner according to claim 1, wherein the length dimension of said opening is made to be a length dimension of approximately twice as long as the reading range of said document.

3. An image scanner according to claim 1, wherein said conductor patterns include a positive conductor pattern and a negative conductor pattern parted from each other by the existence of a very narrow strip of space between them.

* * * * *